(12) United States Patent
Michaud

(10) Patent No.: US 6,841,091 B2
(45) Date of Patent: *Jan. 11, 2005

(54) COMPOSITIONS FOR DRYING SOLID SURFACES

(75) Inventor: Pascal Michaud, Saint-Gratien (FR)

(73) Assignee: Elf Atochem S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,415

(22) Filed: Mar. 4, 1998

(65) Prior Publication Data

US 2003/0155550 A1 Aug. 21, 2003

(30) Foreign Application Priority Data

Mar. 4, 1997 (FR) .............................. 97 02550

(51) Int. Cl.[7] .............................. C09K 3/00; C11D 1/34
(52) U.S. Cl. ...................... 252/194; 252/364; 510/109; 510/364
(58) Field of Search ................. 252/194, 364; 510/109, 364

(56) References Cited

U.S. PATENT DOCUMENTS

| | | | |
|---|---|---|---|
| 3,903,012 A | * | 9/1975 | Brandreth .................. 252/194 |
| 3,957,672 A | * | 5/1976 | Zisman et al. ............. 510/364 |
| 4,089,804 A | * | 5/1978 | Falk ............................. 516/9 |
| 4,182,687 A | * | 1/1980 | Bartlett ...................... 252/194 |
| 4,594,177 A | | 6/1986 | Lantz et al. |
| 4,655,958 A | * | 4/1987 | Jung et al. .................. 252/194 |
| 5,064,560 A | | 11/1991 | Merchant |
| 5,089,152 A | * | 2/1992 | Flynn et al. ................ 252/194 |
| 5,125,978 A | * | 6/1992 | Flynn et al. ................... 134/2 |
| 5,346,645 A | * | 9/1994 | Omure et al. .............. 252/194 |
| 5,514,301 A | | 5/1996 | Bil et al. .................... 510/365 |
| 5,531,916 A | | 7/1996 | Merchant |
| 5,733,416 A | * | 3/1998 | Kaiser ............................ 203/1 |
| 5,868,799 A | * | 2/1999 | Zyhowski et al. ............ 8/142 |

FOREIGN PATENT DOCUMENTS

| | | |
|---|---|---|
| FR | 2 522 007 | 2/1982 |
| FR | 2 691 473 | 5/1992 |
| FR | 2 732 356 | 3/1995 |
| JP | 5-168805 | 7/1993 |
| JP | 5-293303 | 11/1993 |
| JP | 6226005 | 8/1994 |

OTHER PUBLICATIONS

French Search Report dated Oct. 27, 1997.

* cited by examiner

*Primary Examiner*—Jill Warden
*Assistant Examiner*—LaToya I. Cross
(74) *Attorney, Agent, or Firm*—Smith, Gambrell & Russell, LLP

(57) ABSTRACT

A drying composition according to the invention is composed of a solution of a surface-active agent in a mixture of a fluorinated hydrocarbon and of a polyfluorinated alcohol of formula:

$$Rf-(CH_2)_n-OH \qquad (I)$$

in which n is equal to 1 or 2 and Rf represents a linear perfluoroalkyl radical containing from 2 to 8 carbon atoms.

11 Claims, No Drawings

COMPOSITIONS FOR DRYING SOLID SURFACES

FIELD OF THE INVENTION

The invention relates to the field of drying and the subject of the invention is more particularly compositions for removing the water which superficially wets solid surfaces, in particular electronic materials (printed or integrated circuits), precision mechanical components, glass substrates and military, aerospatial, aeronautical or medical equipment.

BACKGROUND OF THE INVENTION

The usual process for dewetting solid surfaces consists in immersing the wet substrate in an organic solution of an ionic or non-ionic surface-active agent. Until recently, the organic solvent commonly used was 1,1,2-trichloro-1,2,2-trifluoroethane (CFC 113) but its use has been banned because of its harmful effect on the stratospheric ozone layer.

The use of 1-chloro-1,1-difluoroethane (HCFC 141b), provided as substitute for CFC 113 in dewetting compositions, is already regulated and before long it will no longer be possible to use this compound.

To replace CFC 113 and HCFC 141b, the use has been envisaged of fluorinated hydrocarbons which, like 1,1,1,3,3-pentafluorobutane (365 mfc), 1,1,1,2,2,4,4-heptafluorobutane (347 mcf), (perfluorobutyl)ethylene ($C_4F_9CH=CH_2$), 1H-perfluorohexane, n-perfluorohexane (PF 5060) or 1,1,1,2,3,4,4,5,5,5-decafluoropentane (43-10 mee), and perfluoro(methylmorpholine) (PF 5052), have no effect on the stratospheric ozone layer (zero ODP), do not exhibit a flash point and, as is shown in the following table, possess physical characteristics which are similar to those of CFC 113 and HCFC 141b.

| Solvent | Boiling point (° C.) | Surface tension at 25° C. (mN/m) | Relative density at 20° C. |
|---|---|---|---|
| CFC 113 | 47.6 | 17.7 | 1.57 |
| HCFC 141b | 32 | 19.5 | 1.23 |
| 365 mfc | 40 | 16.2 | 1.27 |
| 347 mcf | 33.3 | 14.2 | 1.42 |
| $C_4F_9CH=CH_2$ | 59 | 13.6 | 1.46 |
| $C_6F_{13}H$ | 71 | 13 | 1.70 |
| PF 5060 | 56 | 12 | 1.68 |
| PF 5052 | 50 | 13 | 1.70 |
| 43-10 mee | 54 | 14.1 | 1.58 |

However, the replacement of CFC 113 or of HCFC 141b by a fluorinated hydrocarbon such as those mentioned above is unsatisfactory because ionic-surface-active agents, which are most often used in dewetting compositions, are insoluble therein. Non-ionic surface-active agents are soluble in these fluorinated hydrocarbons but their dewetting effectiveness is often unsatisfactory.

To solve this problem in the case of 365 mfc, provision has been made, in the publication of Patent JP 05-168805, for the addition of a cosolvent chosen from alcohols, ketones, alkanes and ethers. However, when the cosolvent is an alcohol comprising 1 to 3 carbon atoms, or a ketone, it is rapidly removed with the water, causing the rapid precipitation of the surface-active agent. As regards alkanes and ethers, they exhibit a flash point, which presents a safety problem for dewetting plants.

DESCRIPTION OF THE INVENTION

It has now been found that the use of tridecafluorooctanol ($C_6F_{13}CH_2CH_2OH$) and more generally of a water-immiscible polyfluorinated alcohol makes it possible to dissolve the majority of dewetting surface-active agents in fluorinated hydrocarbons without a harmful effect on the ozone layer.

The subject of the present invention is thus, as composition useful for the dewetting of solid surfaces, a solution of at least one surface-active agent in a mixture of at least one fluorinated solvent and of at least one polyfluorinated alcohol of general formula:

$$Rf—(CH_2)_n—OH \qquad (I)$$

in which n is equal to 1 or 2 and Rf represents a linear or branched perfluoroalkyl radical containing from 4 to 8 carbon atoms. Such a composition does not exhibit a flash point under the standard determination conditions (ASTM standard D 3828).

In accordance with the present invention, the fluorinated solvent, which is liquid at room temperature, must not contain halogen atoms other than fluorine but it can contain heteroatoms, such as oxygen or nitrogen. Use is advantageously made of a fluorinated solvent with a normal boiling point of between 20 and 100° C., preferably between 30 and 75° C. Saturated or unsaturated fluorinated hydrocarbons containing from 3 to 6 carbon atoms, such as, for example, the compounds 365 mfc, 347 mcf, $C_4F_9CH=CH_2$, PF 5060 and 43-10 mee mentioned above, as well as 1H-perfluorohexane ($C_6F_{13}H$) and 1,1,1,2,2,3,3,4,4-nonafluorohexane, are particularly well suited.

The polyfluorinated alcohols of formula (I) are known products. Among these, it is preferable to use those in which n is equal to 2. A more particularly preferred polyfluorinated alcohol is tridecafluorooctanol ($C_6F_{13}CH_2CH_2OH$ hereinafter TDFO).

The amount of polyfluorinated alcohol necessary to completely dissolve the surface-active agent in the dewetting composition according to the invention can vary within wide limits, depending on the nature of the fluorinated solvent and of the surface-active agent employed and according to the desired concentration of surface-active agent. For a normal concentration of surface-active agent (0.01 to 0.5% by weight), a content of polyfluorinated alcohol ranging up to 30% by weight is generally sufficient to produce complete dissolution of the surface-active agent; in certain cases, even a very low proportion of polyfluorinated alcohol (0.1%) proves to be sufficient. Consequently, in the dewetting composition according to the invention, the content of polyfluorinated alcohol can range from 0.1 to 30% by weight but it is advantageously between 0.5 and 5%.

In the composition according to the invention, the surface-active agent can be any surface-active agent commonly used in dewetting compositions. Thus, non-ionic surface-active agents, such as fatty esters (for example, caprylamine caprylate and caprylamine, dodecylamine or stearylamine caproate), or fluorinated non-ionic surface-active agents, such as, for example, adducts of ethylene oxide with a polyfluorinated alcohol of formula (I), esters of polyfluorocarboxylic acids, (polyfluoroalkyl) aminoalcohols, polyfluoroalkyl sulphides or polysulphides, or polyfluoroalkanecarbonamides or -sulphonamides, can be used. It is also possible to use anionic surface-active agents (for example a polyfluorosulphonic acid) but it is preferable to use cationic surface-active agents and more particularly those obtained by reaction of a mono- or dialkyl phosphoric acid of general formula:

$$(RO)_p(HO)_{2-p}PO_2H \quad (II)$$

in which p is a number ranging from 1 to 2 and R denotes a linear or branched alkyl radical containing from 1 to 18 carbon atoms, with a quaternary ammonium chloride of general formula:

$$R'_2N^+R''_2Cl^- \quad (III)$$

in which R' and R", which are identical or different, each represent a hydrogen atom or an alkyl or hydroxyalkyl radical containing 1 to 4 carbon atoms, and a fluorinated amine of general formula:

$$R_F\text{—}X\text{—}NR^1R^2 \quad (IV)$$

in which $R_F$ represents a linear perfluoroalkyl radical containing from 2 to 20 carbon atoms, X represents a divalent bridge and the symbols $R^1$ and $R^2$, which are identical or different, each represent a hydrogen atom or an alkyl or hydroxyalkyl radical containing 1 to 4 carbon atoms.

Such cationic surface-active agents and their preparation are described in Patents FR 2,522,007 and 2,691,473, the contents of which are incorporated here by reference. As in the abovementioned patents, it is preferable to use:

acids (II) in which R is a butyl, hexyl, 2-ethylhexyl, octyl or tridecyl radical and more particularly mixtures of monoalkyl phosphoric acid and of dialkyl phosphoric acid in which the proportion by weight of the two acids is between approximately 60/40 and 40/60, quaternary ammonium chlorides (III) in which R' is a dodecyl or octadecyl radical and R" is a methyl radical or the commercial products mostly containing these chlorides, fluorinated amines of formula:

$$R_FC_2H_4SO_2NHCH_2CH_2CH_2N(CH_3)_2$$

or $$R_FC_2H_4CONHCH_2CH_2CH_2N(CH_3)_2$$

As in the compositions of the prior art, the content of surface-active agent(s) in the dewetting composition according to the invention can vary within wide limits. This content is generally low (from 0.01 to 0.5% by weight, preferably 0.04 to 0.2%) in ready-for-use dewetting compositions but it can reach up to 30% by weight in concentrated compositions which only have to be diluted for the dewetting operation.

The solid surfaces from which water can be removed by means of a composition according to the invention can be highly varied, provided, however, that their substance (glass, metal, refractory material, plastic, and the like) is insoluble in and cannot be attacked by the fluorinated solvent(s) of the composition according to the invention.

EXAMPLES

The following examples illustrate the invention without limiting it. The cationic surface-active agents SA1 and SA2 were prepared from the following commercial products:

butyl phosphoric acid $(C_4H_9O)_{1.5}(OH)_{0.5}PO_2H$ exhibiting the following acid values:

strong acidity: 0.566 equivalent per 100 g weak acidity: 0.276 equivalent per 100 g which corresponds to a mixture containing approximately 40% of monobutyl phosphoric acid and 60% of dibutyl phosphoric acid.

Noramium M2C: mixture of different homologues of formula:

$$R'_2N^+(CH_3)_2Cl^-$$

in which the distribution of the fatty chains (R') is as follows:

| | |
|---|---|
| $C_8$ | 3% |
| $C_{10}$ | 6% |
| $C_{12}$ | 56% |
| $C_{14}$ | 18% |
| $C_{16}$ | 10% |
| $C_{18}$, saturated | 2% |
| $C_{18}$, unsaturated | 5% |

This commercial product contains 75% of active material and contains 0.161 chloride equivalent per 100 g.

Preparation of the Surface-Active Agent SA1

2.69 g of butyl phosphoric acid, 3.91 g (i.e. 7.6 meq.) of the fluorinated amine $C_6F_{13}C_2H_4SO_2NHCH_2CH_2CH_2N(CH_3)_2$, 3 g of a 10% methanolic sodium hydroxide solution (i.e. 7.6 meq. NaOH) and 8.32 g of Noramium M2C are added successively and with stirring to 150 g of HCFC 141b. This final addition causes the immediate formation of a sodium chloride precipitate which is removed by filtration (weight of NaCl collected: 0.4 g).

After removing the sodium chloride precipitate, the filtrate is then evaporated to dryness at 110° C. in an oven. 14.8 g of surface-active agent SA1 are thus obtained.

Preparation of the Surface-Active Agent SA2

The preparation is carried out as above but replacing the 150 g of HCFC 141b with 300 g of TDFO and dispensing with the final stage of evaporation to dryness. A solution containing approximately 5% of surface-active agent SA2 in TDFO is thus obtained.

Example 1

A dewetting solution is prepared by dissolving 100 mg of surface-active agent SA1 in a mixture of 95 g of HFC 365 mfc and 5 g of TDFO and then this solution is introduced into a beaker placed in a small Branson 2200 ultrasonic vessel.

A 20×50 mm stainless steel grid, wetted beforehand by immersion in water, is then immersed in the dewetting solution and maintained under ultrasonic agitation for one minute.

After having been withdrawn from the dewetting solution, the grid is immersed in absolute alcohol and the quantitative determination of water by the Karl Fischer method indicates that 94% of the water has been removed.

The same result is obtained if the fluorinated alcohol TDFO is replaced with the same amount of a technical mixture of alcohols of formula Rf—$CH_2CH_2$—OH, the distribution of the Rf radicals being centred about $C_6$.

If the fluorinated alcohol TDFO is replaced with the same amount of n-pentanol or of n-hexanol, the degree of removal of the water is only 60% and 72% respectively.

Example 2

A dewetting solution is prepared by mixing 1 g of the solution containing 5% of surface-active agent SA2 and 99 g of HFC 365 mfc. A dewetting solution containing 500 ppm of surface-active agent SA2 is thus obtained, which solution is used as in Example 1. The degree of removal of the water is 95%.

Substantially the same result is obtained by using a dewetting solution containing 0.1% of surface-active agent SA2 in a mixture of 99 g of HFC 365 mfc and 1 g of TDFO.

Examples 3 to 11

The procedure is as in Example 2, but replacing the solvent HFC 365 mfc with other fluorinated solvents. The operating conditions and the results are combined in the following table.

| Example | Solvent | (%) | % of TDFO | SA2 (ppm) | Water removed (%) |
|---|---|---|---|---|---|
| 3 | 347 mcf | 98 | 2 | 500 | 93 |
| 4 | $C_4F_9CH=CH_2$ | 95 | 5 | 1000 | 92 |
| 5 | $C_4F_9CH=CH_2$ | 99 | 1 | 500 | 95 |
| 6 | $C_4F_9CH_2CH_3$ | 99 | 1 | 500 | 91 |
| 7 | $C_4F_9CH_2CH_3$ | 98 | 2 | 500 | 92 |
| 8 | $C_6F_{13}H$ | 98 | 2 | 500 | 91 |
| 9 | PF 5060 | 99 | 1 | 500 | 92 |
| 10 | PF 5052 | 99 | 1 | 500 | 94 |
| 11 | 43-10 mee | 98 | 2 | 500 | 94 |

Example 12

The procedure is as in Example 1, but replacing the fluorinated alcohol TDFO with pentafluoropropanol ($CF_3CF_2CH_2OH$, hereinafter PFP) and using a dewetting solution obtained by dissolving 100 mg of surface-active agent SA1 in a mixture of 80 g of HFC 365 mfc and 20 g of PFP. The degree of removal of the water is 95%.

Example 13

The procedure is as in Example 1, but using a dewetting solution obtained by dissolving 100 mg of N,N'-dioleoyl-N-oleylpropylenediamine (hereinafter surfactant SA3) in a mixture of 90 g of HFC 365 mfc and 10 g of TDFO. The degree of removal of the water is 91%.

If the TDFO is replaced with the same amount (10 g) of PFP, the degree of removal of the water is 93%.

Example 14

The procedure is as in Example 1, but using a dewetting solution obtained by dissolving 100 mg of the adduct of 6 mol of ethylene oxide with one mole of TDFO in a mixture of 99 g of HFC 365 mfc and 1 g of TDFO. The degree of removal of the water is 90%.

If the mixture of 365 mfc and of TDFO is replaced with a mixture of 90 g of 365 mfc and 10 g of PFP, the degree of removal of the water is also 90%.

Examples 15 to 18

The procedure is as in Example 1, but replacing the fluorinated alcohol TDFO with PFP and using a dewetting solution obtained by dissolving, in a mixture of 80 g of HFC 365 mfc and 20 g of fluorinated alcohol PFP, 100 mg of one of the following surface-active agents:

SA4=$C_6F_{13}C_2H_4(OC_2H_4)_6OH$
SA5=$C_8F_{17}C_2H_4N(C_2H_4OH)_2$
SA6=$C_6F_{13}C_2H_4SO_2NHCH_2CH_2CH_2N(CH_3)_2$
SA7=$C_6F_{13}C_2H_4SO_3H$, $H_2NCH_2CH(C_2H_5)C_4H_9$

The results obtained are combined in the following table.

| Example | Surface-active agent | Water removed (%) |
|---|---|---|
| 15 | SA4 | 93 |
| 16 | SA5 | 93 |
| 17 | SA6 | 93 |
| 18 | SA7 | 95 |

Example 19

22 litres of the dewetting solution of Example 2 are charged to the dewetting and settling tanks of a drying machine with a capacity of 33 litres and 11 litres of pure HFC 365 mfc are charged to the rinsing vessel.

A wet stainless steel grid, resulting from a prior washing and rinsing treatment in aqueous medium, is immersed in the dewetting tank for 3 minutes and then rinsed for 3 minutes in the pure HFC 365 mfc at boiling point.

The drying performance was evaluated in the following way:

The grid is subsequently immersed in 100 g of absolute ethanol, the water content of which was determined beforehand by the Karl Fischer method. A new quantitative determination carried out after immersion of the grid revealed no increase in the water content, which means that the composition according to the invention makes it possible to obtain virtually complete removal of the water.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A water-removing dewetting composition, consisting essentially of a solution of between 0.01 and 0.5% by weight of at least one surface-active agent in a mixture of at least one fluorinated solvent and from 2% to 30% by weight of at least one water-immiscible polyfluorinated alcohol of formula:

$$R_f—(CH_2)_n—OH \qquad (I)$$

in which n is equal to 1 or 2 and $R_f$ represents a linear or branched perfluoroalkyl radical containing from 4 to 8 carbon atoms, wherein said composition does not exhibit a flash point under standard determination conditions (ASTM standard D 3828), further wherein the fluorinated solvent is selected from the group consisting of 1,1,1,3,3-pentafluorobutane, 1,1,1,2,2,4,4-heptafluorobutane, 1,1,1,2,3,4,4,5,5,5-decafluoropentane, 1,1,1,2,2,3,3,4,4-nonafluorohexane, 1H-perfluorohexane, n-perfluorohexane, (perfluorobutyl) ethylene and perfluoro (methylmorpholine);

further wherein the surface-active agent is a cationic surface-active agent obtained by reaction of a mono- or dialkylphosphoric acid of formula:

$$(RO)_p(HO)_{2-p}PO_2H \qquad (II)$$

in which p is a number ranging from 1 to 2 and R denotes a linear or branched alkyl radical containing from 1 to 18 carbon atoms, with a quaternary ammonium chloride of formula:

$$R'_2N^+R''_2Cl^- \qquad (III)$$

in which R' and R", which are identical or different, each represent a hydrogen atom or an alkyl or hydroxyalkyl radical containing 1 to 4 carbon atoms, and a fluorinated amine of formula:

$$R_f\text{—}X\text{—}NR^1R^2 \hspace{2cm} (IV)$$

in which $R_f$ represents a linear perfluoroalkyl radical containing from 2 to 20 carbon atoms, X represents a divalent bridge and the symbols $R^1$ and $R^2$, which are identical or different, each represent a hydrogen atom or an alkyl or hydroxyalkyl radical containing 1 to 4 carbon atoms.

2. The composition according to claim 1, wherein the composition contains at least one alcohol of formula (I) in which n is equal to 2.

3. The composition according to claim 1, wherein the alcohol of formula (I) is tridecafluorooctanol ($C_6F_{13}CH_2CH_2OH$).

4. The composition according to claim 1, wherein the fluorinated solvent has a normal boiling point of between 20 and 100° C.

5. The composition according to claim 4, wherein the boiling point of the fluorinated solvent is between 30 and 75° C.

6. The composition according to claim 1, wherein R is butyl, hexyl, 2-ethylhexyl, octyl or tridecyl radical, R' is a dodecyl or octadecyl radical, R" is a methyl radical, X is a —$CH_2CH_2SO_2NHCH_2CH_2$— or $C_2H_4CONHCH_2CH_2$— bridge and $R^1$ and $R^2$ are methyl radicals.

7. The composition according to claim 1, wherein said composition is in the form of a concentrate containing up to 30% by weight of surface-active agent(s).

8. The method for dewetting of solid surfaces comprising treating a solid surface with the composition of claim 1.

9. The composition according o claim 1, wherein the content of polyfluorinated alcohol(s) is from 2% to 5%.

10. The composition according claim 1, wherein the content of the surface-active agent(s) is between 0.04 and 0.2%.

11. A water-removing dewetting composition, consisting essentially of a solution of at least one surface-active agent in a mixture of at least one fluorinated solvent and from 2% to 30% by weight of at least one water-immiscible polyfluorinated alcohol of formula:

$$R_f\text{—}(CH_2)_n\text{—}OH \hspace{2cm} (I)$$

in which n is equal to 1 or 2 and Rf represents a linear or branched perfluoroalkyl radical containing from 4 to 8 carbon atoms, wherein the surface-active agent consists of a cationic surface-active agent obtained by reaction of a mono- or dialkyl phosphoric acid of formula:

$$(RO)_p(HO)_{2-p}PO_2H \hspace{2cm} (II)$$

in which p is a number ranging from 1 to 2 and R denotes a linear or branched alkyl radical containing from 1 to 18 carbon atoms, with a quaternary ammonium chloride of formula:

$$R'_2N^+R''_2Cl^- \hspace{2cm} (III)$$

in which R' and R", which are identical or different, each represent a hydrogen atoms or an alkyl or hydroxyalkyl radical containing 1 to 4 carbon atoms, and a fluorinated amine of formula:

$$R_f\text{—}X\text{—}NR^1R^2 \hspace{2cm} (IV)$$

in which $R_f$ represents a linear perfluoroalkyl radical containing from 2 to 20 carbon atoms, X represents a divalent bridge and the symbols $R^1$ and $R^2$, which are identical or different, each represent a hydrogen atom or an alkyl or hydroxyalkyl radical containing 1 to 4 carbon atoms;

further wherein said composition does not exhibit a flash point under standard determination conditions (ASTM standard D 3828), further wherein the fluorinated solvent is selected from the group consisting of 1,1,1,3,3-pentafluorobutane, 1,1,1,2,2,4,4-heptafluorobutane, 1,1,1,2,3,4,4,5,5,5-decafluoropentane, 1,1,1,2,2,3,3,4,4-nonafluorohexane, 1H-perfluorohexane, n-perfluorohexane, (perfluorobutyl) ethylene and perfluoro (methylmorpholine).

* * * * *